(12) United States Patent
Breuer et al.

(10) Patent No.: US 11,930,446 B2
(45) Date of Patent: Mar. 12, 2024

(54) METHOD FOR OPERATING USER EQUIPMENT WITH A BASE STATION OF CELLULAR NETWORK

(71) Applicant: Telit Cinterion Deutschland GmbH, Munich (DE)

(72) Inventors: Volker Breuer, Boetzow (DE); Lars Wehmeier, Falkensee (DE)

(73) Assignee: Telit Cinterion Deutschland GmbH, Munich (DE)

( * ) Notice: Subject to any disclaimer, the term of this patent is extended or adjusted under 35 U.S.C. 154(b) by 414 days.

(21) Appl. No.: 17/291,117

(22) PCT Filed: Oct. 29, 2019

(86) PCT No.: PCT/EP2019/079464
§ 371 (c)(1),
(2) Date: May 4, 2021

(87) PCT Pub. No.: WO2020/094451
PCT Pub. Date: May 14, 2020

(65) Prior Publication Data
US 2022/0007276 A1      Jan. 6, 2022

(30) Foreign Application Priority Data
Nov. 9, 2018   (EP) .................................... 18205465

(51) Int. Cl.
*H04W 48/18*      (2009.01)
*H04W 48/06*      (2009.01)
(Continued)

(52) U.S. Cl.
CPC ........... *H04W 48/18* (2013.01); *H04W 48/06* (2013.01); *H04W 76/16* (2018.02); *H04W 88/10* (2013.01)

(58) Field of Classification Search
CPC ..... H04W 48/18; H04W 48/06; H04W 76/16; H04W 88/10; H04W 4/70
See application file for complete search history.

(56) References Cited

U.S. PATENT DOCUMENTS 9,432,928 B1 * 8/2016 Keller ................... H04W 48/06
2018/0323804 A1 * 11/2018 Sadiq ................... H04L 1/0041
(Continued)

FOREIGN PATENT DOCUMENTS

WO      2018142303 A1   8/2018

OTHER PUBLICATIONS

"3rd Generation Partnership Project; Technical Specification Group Core Network and Terminals; Non-Access-Stratum (NAS) protocol for Evolved Packet System (EPS); Stage 3 (Release 15)", vol. CT WG1, No. V15.4.0, XP051487107, Sep. 21, 2018, pp. 1-530.
(Continued)

*Primary Examiner* — Kathy W Wang-Hurst
(74) *Attorney, Agent, or Firm* — PEARL COHEN ZEDEK LATZER BARATZ LLP (57) ABSTRACT

The present invention relates to a method for operating a user equipment with a base station assigned to at least two core networks in co-existence mode of a cellular network, the user equipment operating in a data communication mode with direct connection termination in the at least one core network, the method comprising the steps for the user equipment of:—camping on a base station with access to at least two core networks of different technology standards, —receiving a transmission from said base station indicating available radio resources of the first and of the second core network, —selecting the core network which is appropriate for said envisaged connection, —sending a connection request for envisaged connection to the base station using parts of said indicated radio resources belonging to the
(Continued)

selected core network, —receiving a response indication from the base station.

13 Claims, 3 Drawing Sheets

(51) Int. Cl.
*H04W 76/16* (2018.01)
*H04W 88/10* (2009.01)

(56) References Cited

U.S. PATENT DOCUMENTS

| | | | | |
|---|---|---|---|---|
| 2020/0084818 A1* | 3/2020 | Xu | ......................... | H04W 76/18 |
| 2020/0229075 A1* | 7/2020 | Andreoli-Fang | ..... | H04W 48/12 |
| 2021/0314823 A1* | 10/2021 | Xu | .................... | H04W 36/0066 |
| 2022/0007276 A1* | 1/2022 | Breuer | .................. | H04W 48/18 |

OTHER PUBLICATIONS

"3rd Generation Partnership Project; Technical Specification Group Services and System Aspects; General Packet Radio Service (GPRS) enhancements for Evolved Universal Terrestrial Access Network (E-UTRAN) access (Release 16)", XP51535183, Sep. 17, 2018, pp. 1-410.

"3rd Generation Partnership Project; Technical Specification Group Services and System Aspects; Study on Cellular IoT support and evolution for the 5G System (Release 16)", XP051487767, vol. SA WG2, No. V1.1.0, Nov. 3, 2018, pp. 1-267.

"3rd Generation Partnership Project; Technical Specification Group Services and System Aspects; System Architecture for the 5G System; Stage 2 (Release 15)" XP051535184, Sep. 17, 2018, pp. 1-226.

"3rd Generation Partnership Project; Technical Specification Group Radio Access Network; Evolved Universal Terrestrial Radio Access (E-UTRA)and Evolved Universal Terrestrial Radio Access Network (E-UTRAN); Overall description; Stage2 (Release15)", XP051519422, Oct. 2, 2018, pp. 1-358.

International Search Report (PCT/ISA/210) and Written Opinion (PCT/ISA/237) dated Nov. 18, 2019, by the European Patent Office as the International Searching Authority for International Application No. PCT/EP2019/079464.

\* cited by examiner

Fig. 3

METHOD FOR OPERATING USER EQUIPMENT WITH A BASE STATION OF CELLULAR NETWORK

CROSS-REFERENCE TO RELATED APPLICATIONS

This application is a National Phase Application of PCT International Application No. PCT/EP2019/079464, International Filing Date Oct. 28, 2019, claiming the benefit of European Patent Application No. 18205465.0, filed Nov. 9, 2018, which are hereby incorporated by reference.

FIELD OF THE INVENTION

The present invention relates to a method for operating a user equipment. The invention also pertains to a user equipment using said method.

The invention further relates to a method for a base station for operating said user equipment. The invention additionally pertains to a base station using said method.

BACKGROUND OF THE INVENTION

Generally, in the field of wireless cellular communication it is known that user equipments are operating with one of a plurality of base stations with a cellular network. In today's coexistence of multiple radio access networks for the respective cellular technology standard generations like 2G (GSM), 3G (UMTS), 4G (LTE), the user equipment has access to one of these radio access networks by camping on a base station assigned to the radio access networks. Base stations for 2G are called base station (BS), for 3G nodeB and for 4G eNodeB and for 5G gNodeB. Depending on the respective generation the term base station covers the respective type of base station.

In the advent of the next generation 5G (New Radio) it is however foreseen that for one base station access to at least two radio access networks is possible. This is due to the fact that flavors of LTE in particular for machine-type communication or IoT-devices are downwards compatibly used for 5G as well. That means, that a user equipment capable of using the LTE variant LTE Cat Nb-IoT may access without changing the air interface protocol both 4G eNodeBs and 5G gNodeBs providing both a common NB-IoT configuration on the air interface, especially for the physical layer and related lower level signaling for legacy user equipments. Moreover, the base stations may have access to one or to both core networks. Hence, the question, if the user equipment is currently operating in 4G or 5G is not unambiguously clear.

Moreover this question is important as in the case of LTE Cat NB-IoT (in short: NB-IoT) the access terminates its connection in the core network when the user equipment is using the so called C-IoT optimizations (control-plane IoT optimization). C-IoT optimization means user data are encapsulated in the NAS-bearer terminating in the core network—respectively the MME in 4G and correspondingly the AMF in 5G—whilst the network architecture for operating NB-IoT in 5G does not yet exist in detail. Hence the user equipment needs to have means to select the core network it wants to access. This is in particular important when a special service or slice (in 5G) is desired, which is only provided by one of the available core networks.

In addition the situation may also occur that for special traffic reasons such as non-IP data via NAS (C-IoT) contact to the 4G MME is desired which forwards data to corresponding SCEF (Service Control Exposure Function).

For future generations the same situation might apply.

Hence it requires a solution for assuring that the user equipment gets access to the desired core network also for NB-IoT. Further alternative and advantageous solutions would, accordingly, be desirable in the art.

SUMMARY OF THE INVENTION

For this it is according to a first aspect of the invention suggested a method to operate a user equipment according to some embodiments of the invention. It is further suggested according to a second aspect of the invention a user equipment according to some embodiments of the invention.

According to a third aspect of the invention it is suggested a method to operate a base station according to some embodiments of the invention. It is further suggested according to a fourth aspect of the invention a base station according to some embodiments of the invention.

According to the first aspect of the invention it is proposed a method for operating a user equipment with a base station assigned to at least two core networks in co-existence mode of a cellular network, the user equipment operating in a data communication mode with direct connection termination in the at least one core network, the method comprising the steps for the user equipment of:
  camping on a base station with access to at least two core networks of different technology standards,
  receiving a transmission from said base station indicating available radio resources of the first and of the second core network,
  selecting the core network which is appropriate for said envisaged connection,
  sending a connection request for envisaged connection to the base station using parts of said indicated radio resources belonging to the selected core network,
  receiving a response indication from the base station.

The inventive method relates to a user equipment being capable of operating with a base station of a cellular network for wireless communication, in particular those implementing the wireless technology standards of 4G (LTE), 5G (New Radio) or beyond.

The inventive method relates to such user equipments operating in a data communication mode with direct connection termination. This is in particular the case for LTE category NB-IoT (Narrowband Internet of Things), but could also be other modes, e.g. future modes in 5G or beyond.

NB-IoT is foreseen to allow user equipments with low capabilities to access the cellular network by offering a narrowband communication category. This is in particular known as category narrowband-IoT, which comprises for a assigned frequency band to only access a narrow subband, which is in particular operating in another coding scheme than the rest of the frequency band is assigned to. This helps low-capability user equipments to communicate preferably both in uplink and downlink with much less efforts in processing power with a base station of a cellular network of the newest generations. It is already decided to maintain this category also for 5G. However the invention is not limited to 4G or 5G NB-IoT.

In particular for NB-IoT it is defined the characteristics that it terminates directly in the respective core network. The involved base station only acts as passive air interface and makes no decisions about routing the received data.

The core network of a cellular network comprises components of the cellular network for assuring the connectivity between user equipments among each other, being either operating within the same cellular network or different cellular networks, or establishing access to remote servers, in particular via the internet. The core network typically comprises core components, servers and gateways including home location register (HLR) and other entities required for authentication and allowing access and resource usage of a user equipment in a specific cellular network of a specific cellular network operator. The communication of the user equipment to the core network is called NAS (non-access-stratum) whereas the user equipment AS (access-stratum) communication is terminated in the base station i.e. the radio.

In other words the core network are entities which if needed are approached by the user equipment with NAS signaling (in 4G EPC bearers) whilst AS signaling (radio bearers/radio protocols) are terminated in the eNodeB.

For 5G the core network, or at least a major part of it, is called 5G NextGen Core, for 4G it is called Evolved Packet Core.

For the case of a base station with access to at least two core networks of different technology standards it would be consequently the user equipment which has to decide about which core networks is accessed.

Here comes the invention into play. It proposes an inventive method for a user equipment to carry out this decision and the subsequent access to the respective core network.

The inventive method starts with a user equipment camping on a base station with access to at least two core networks of different technology standards. The user equipment gets latest aware of that situation, when it receives a transmission from said base station indicating available radio resources of both core networks.

Such radio resources are preferably in time or frequency domain or new formats to be exclusively, in particular used for access to 5G core. In any case for the user equipment it is detectable which radio resources belong to which core network. So far resources are assigned and can be indicated to NB-IoT which are supposed to be used for accessing the system in dependency of the RSRP level, i.e. the reception level corresponding to a certain resource category. This is so far defined as rsrp-ThresholdsPrachInfoList and provided as part of the broadcasted system information (SIBs).

The criterion NB-IoT user equipments in coverage enhancement (CE) to select PRACH resource set up to 3 RSRP threshold values are signaled to determine the CE level for PRACH, see TS 36.213. The first element corresponds to RSRP threshold 1, the second element corresponds to RSRP threshold 2 and so on, see TS 36.321 [6].

Besides the resource which can be used by a NB-IoT user equipment for accessing the system in dependency of the RSRP level, a second set of resources is preferably introduced which indicates resources to be used for accessing the new core network. In that respect a user equipment supporting both core networks is in the position decide which to access, and legacy user equipments may directly access by using resources indicated in rsrp-ThresholdsPrachInfoList in SIB2. A list for accessing the new core network could be defined as NextGenCore-rsrp-ThresholdsPrachInfoList in another SIB.

Said information would be conveyed to the user equipment in the PRACH configuration system information broadcast or a respective extension container to said system information.

As a next step it is foreseen for the user equipment to select radio resources belonging to the core network the user equipment is supposed to access. For making the selection the user equipment evaluates which of the core network, resp. its resources are appropriate for the envisaged connection, in particular the planned transmission or reception of data packets.

This selection may be driven beforehand or in response to the radio resource information received from the base station. With that the user equipment has means to figure out if the core network is appropriate, means it fulfills the requirements for the envisaged connection.

In a first embodiment it is proposed that the selection of the core network comprises considering availability of a core network capability.

This advantageous embodiment relates to a beforehand configuration of the user equipment.

It considers for the selection of the core network at least one requirement the user equipment has in regards to the selected core network. This is in particular provided through preconfiguration of the user equipment. Hence, when the user equipment is e.g. trying to access a certain desired, preconfigured service, such service needs to be supported by the selected core network in order for it to be rated as appropriate.

Consequently the core network capability needs to be figured out. For that the base station provides information relating to such core network capabilities. As an advantageous example for 5G such capabilities in particular are known as slice discovery. With this the user equipment figures out which slices, and consequently services are available. Network slicing is a type of virtual networking architecture introduced for 5G, that allows to tailor virtual end-to-end networks for certain application or service requirements. Preferably different components are involved in order not to affect a whole network stability with a certain highly occupied slice.

Or as indicated further above, via the from the base station provisioned information related to executing RACH access on said cell, in particular the element PRACH-ConfigSIB and IE PRACH-Config, which are used to specify the PRACH configuration in the system information the user equipment would receive the rsrp-ThresholdsPrachInfoList or in case also the 5G NextGen core is directly reachable for NB-IoT devices also the NextGenCore-rsrp-ThresholdsPrachInfoList.

Hence the user equipment may select or discard an available core network at a base station.

Said core network capability is according to a preferred embodiment at least one of:
 a network slice,
 a network service,
 desired power saving,
 desired QoS,
 a special communication form,
 a roaming criterion.

The network slice resp. network service is in particular available through 5G networks, but could be available in future networks as well.

The desired power saving relates to network capabilities offering the possibility to avoid signaling efforts, e.g. going in sleep mode, like eDRX etc.

With the desired QoS it is meant a specific quality of service that is expected by the user equipment. The quality of service is in particular qualified by attributes like the availability, transfer delays, bandwidth or the like. It is often represented by traffic classes. The networks capabilities offer a certain QoS, and when it is not sufficiently fulfilling the user equipments requirement it has to decide if the other core network is more appropriate.

With the special communication form it is in particular foreseen to involve IP or non-IP network traffic. The latter related in particular to certain types of non-IP network capabilities terminating in the MME to SCEF which is by now only to available for 4G. In order to send data to an application, two optimizations for the cellular internet of things (CIoT) in the evolved packet system (EPS) were defined, the User Plane CIoT EPS optimization and the Control Plane CIoT EPS optimization. In general NIDD/Non-IP data is part of the CIoT EPS optimisations. A PDN Type "Non-IP" is used for Non-IP data. The Non-IP data delivery via Control plane is done by means of the SCEF. By selecting the PDN type non-IP the MME is aware of this being non-IP data and forwards related packets to the SCEF. The SCEF has related information or can retrieve information related to the receiver of said information from the home location register. The SCEF uses this knowledge and routes the packet then accordingly. Means in simple words the SCEF does a conversion for the data being suitable to be routed in the core network. The advantage of this method is, that the user equipment does not need to send the IP header IPv6 of 40 Bytes and hence saves payload and power. The SCEF adds the corresponding information to the data packet.

With a roaming criterion it is meant the situation that the user equipment is operating in a visited network, and hence it needs to be figured out if it may access a certain service resp. slice. Means a NB-IoT user equipment may be accepted by a visited PLMN to access via NB-IoT radio whether provided from a 4G or 5G bases station, however, the core network behind, may only accept roaming users for the legacy 4G core, where PLMN inter-working is already established and provided. Furthermore the access to the slice may be restricted to the operators own user equipments or user equipments being registered for an equivalent PLMN but no roaming users.

The selection of the core networks might additionally be based on the availability of the respective core network.

This includes in particular in a first embodiment receiving a message from said base station indicating high occupancy of one of said core networks, and considering said occupancy indication for the step of selecting the core network.

This information indicates to the user equipment that the respective core network is already highly occupied, and potentially the amount of resources for the pending connection session is not at hand. Such information in particular is made available with the transmission indicating available radio resources. A core network which may not or hardly not be accessed is in that sense not viewed as being appropriate for the user equipment.

Additionally it is in particular foreseen in another embodiment receiving a message from said base station indicating barring of one of said core networks, and considering said barring indication for the step of selecting the core network.

This information indicates to the user equipment that the respective core network is barred, in particular for the type of user equipment it belongs to. Barring is typically indicated by the system information, in particular in SIB1. In the case of device specific system information, in particular machine-type (M-SIBs), for user equipments belonging to that device type the (selective) barring is applicable. This is in particular useful when many IoT devices try to access the network at the same time due to a disadvantageous signaling cycle.

It is apparent that with reception of one of such messages the user equipment would refrain from accessing the indicated core network. A barred core network is not seen as appropriate for the user equipment.

This embodiment is in particular advantageous as it allows the user equipment to decide ad hoc in case of receiving such messages from a core network it originally planned to access, if it makes sense to select resources of the other network, despite its original plans. The user equipment might prefer to use at least an available service at the other core network, in order to avoid having no connection at all, provided the other core network can support the desired service or anything similar at all.

This in particular is comprised in a priority of requirements of the user equipment towards the available core network to be appropriate. Such priority in particular governs if—when a certain requirement is not available at a core network—a connection may be requested with this core network or not.

Once the selection is carried out, the user equipment according to the inventive method sends a connection request to the base station, which indicates the desired radio resources. With this indication the base station forwards the request to the respective core network depicted through the radio resources.

When this connection request is successful the user equipment then expects to receive a response indication from the base station, information about the status of the connection request, in particular that the connection has been set up or rejected.

In a preferred embodiment it is suggested that for a user equipment operating non-stationary and being capable to select a new serving base station in case of detecting a radio link failure for the communication with the previously serving base station, the method further comprising the steps of:

selecting a new base station, sending a connection request to the new base station being indicative of the core network being operated with the previously serving base station.

This embodiment relates mainly to a user equipment which is mobile. As it is known that many NB-IoT user equipments are installed stationary, e.g. as e-meter, as part of a vending machine etc. Stationary in that sense means immobile, at least for a foreseeable time. Nonetheless it can happen that NB-IoT user equipments are moving and hence need to switch from one base station to the other.

For reducing the overhead and in expectation of mainly stationary operated user equipments, the mobility handling of NB-IoT is massively reduced compared to the normal operation, in particular for mobile handsets.

As a result handover/reselection is substituted by a simple detection of radio link failure (RLF) on the currently serving base station. Once this takes place, the user equipment searches for the best suitable base station and tries to continue operation.

As time and an undisrupted connection is not the first priority of NB-IoT user equipments, this was decided as having low impact but saves a lot of power and resources. However, for the problem solved with present invention it raises the issues that when being in operation with a once selected core network on a first base station, and then accessing the next base station, there is a need to assure that the user equipment selects, in particular is allowed to select the same core network as it was used before. Even though the NB-IoT mobility is based on radio-link-failure i.e. maintain a connection till it breaks, set-up a new connection and ask to retrieve the communication session from the previous base station the communication session as such stays uninterrupted, i.e. a transmission can be finalized. Now there is not only one base station from which the communication session is to be retrieved, but also information on the previous used core network which are of relevance, i.e. access the same core for communication session continuity. This is in particular of relevance, when the core network would not allow a new user equipment to setup a new connection due to a lack of free resources.

For solving this issue the preferred embodiment suggests that the user equipment indicates with the connection request to the new base station, that it was active with the previously serving base station on a certain core network. For this purpose, if provided the UE uses the resources on the radio associated with the previous used core network on the new base station.

In a more advanced case also a corresponding indication can be included, however this may cause additional signaling load and brings only limited benefit. Especially when relying on the fact that newly accessing user equipments would follow a corresponding overload indication and not select the corresponding core if not absolutely necessary i.e. having had a connection to said core network earlier on and the communication session is not finished yet.

It is envisaged that the core network then assigns the resources that were previously allocated to the user equipment, to the user equipment via the new base station as well.

This assures that the desired core network is selected again, and moreover that user equipment can continue accessing the core network, even though it would appear fully occupied for new connection requests.

For the core network this embodiment has the advantage that the previously reserved resources are then used and potentially regularly released by the user equipment when terminating the communication session. With a radio-link-failure no such regular termination takes place and the allocated resources are with a high likelihood far later available for other user equipments than with the proposed embodiment.

According to the second aspect of the invention it is proposed a user equipment for operating with a base station assigned to at least two core networks in co-existence mode of a cellular network, the user equipment operating in a mode with direct connection termination in the at least one core network, wherein the user equipment is configured to:
    camp on a base station with access to at least two core networks of different standards,
    receive a transmission from said base station indicating resources of the first and of the second core network,
    select the core network which is appropriate for said envisaged connection,
    send a connection request for envisaged connection to the base station comprising said indicated resource belonging to the selected core network.

The user equipment provides a couple of components for conducting wireless communication. This comprises at least processing circuitry for executing operation software, in particular those implementing the method of the first aspect of the invention.

Further the user equipment comprises transmitting and receiving circuitry in connection with at least one antenna, typically a transceiver for exchanging wireless communication signals with a base station of the cellular network. Further a memory unit for volatiles and/or permanent storage of executable software, configuration data and measured data e.g. before receiving the transmission from the serving base station.

The second aspect of the invention shares the advantages of the first aspect of the invention.

According to the third aspect of the invention it is proposed a method for operating a base station assigned to at least two core networks in co-existence mode of a cellular network, providing direct connection termination access to one of said core networks, for at least one user equipment camping on the base station, the method comprising the steps of:
    sending a resource indication transmission to at least one of the camping user equipment, wherein the resource indication transmission indicates available resources of at least two of the at least two core networks,
    receiving a connection request comprising a resource indication of the selected core network,
    setting up a connection with the selected core network comprising indicating the selected resource to the selected core network,
    sending a connection setup indication to the requesting user equipment.

This aspect of the invention relates to the base station as counterpart on the air interface for a user equipment according to the second aspect of the invention for reaching the addressed problem. Hence, for solving the addressed problem it is expected that also the base station supports the user equipment in its effort.

The base station is one of a plurality of base station of the cellular network, and configured to implement the technology standard of 4G or 5G. Further it is capable of operating in narrowband communication category, that is NB-IoT. Due to the continuation of NB-IoT for 5G a user equipment operating in NB-IoT might camp on a 5G or 4G base station. One base station consequently has access to core components of the cellular network supporting 4G and 5G in parallel, or any other combination. The base station therefore has a communication connection to the at least two core networks. Such communication connection is typically a wired connection.

Usually the base station is not only supporting NB-IoT but also other categories of 4G resp. 5G or beyond.

However, for NB-IoT access to the specific core network the user equipment does not take the decision which core network is accessed. However it carries out steps for supporting the user equipment by making this decision and carrying it out.

This is done by sending a resource indication transmission to a user equipment which is served by the base station in question. This resource indication transmission comprises resource indications for at least two accessible core networks.

When the base station receives a connection request messages from the camping user equipment wherein a resource indication is comprised, it is for the base station decided to which core network it will carry out the connection setup. The connection request message typically comprises an indication of the communication endpoint, in particular a server URL or any other type of indication.

The base station the preferably takes the defined steps for setting up a connection for the user equipment and reserving the selected resources at the core network, where the resources are originated from.

When this is successfully carried out, the base station sends a connection setup indication to the requesting user equipment, which is consequently then operating in connected mode through the selected core network to the depicted communication endpoint.

Otherwise a connection reject indication is sent to the user equipment.

Such a rejection is in particular sent in case of high occupancy of the respective core network.

This is the case when a given level of occupancy is reached at one or all accessible core networks, which is figured out by the base station in conjunction with the core networks.

With that the user equipment is informed about resource shortage in the accessible core networks. this is advantageous as it helps the user equipment to consider delaying a data transmission to another point in time. Preferably the user equipment has means for adjusting the data transmission schedule, e.g. for a metering application. When it turns out that at a certain predefined time the desired core network is usually occupied, which is indicated by said rejection message, then the user equipment might adjust its transmission schedule to a later time.

According to another preferred embodiment it is proposed that the base station is further configured to retrieve a connection request from a user equipment with a selected core network, the method comprising the step of:

determining if the user equipment has operated with a neighbor base station in said selected core network before, allowing access to said selected core network, despite the level of occupancy.

This embodiment supports mobility of a user equipment. It relates to a base station receiving a connection request from a user equipment it was previously not serving. Hence, should the core network indicate full occupancy normally the user equipment connection request to said core network would need to be rejected.

This is not the case when the user equipment, in particular a non-stationary, that means mobile, user equipment set up its connection on another base station, in particular a neighbor base station. In course of that setting up, as indicated above, the neighbor base station supported the user equipment in deciding to which accessible core network to set up the connection.

When the user equipment is moving towards the base station in question, it will ask the base station for access to a core network. To assure that no rejection, in particular due to unavailability of resources, takes place, the base station receives an indication that the user equipment has operated with a neighbor base station in said selected core network before.

This gives sufficient indication that the user equipment was already connected before. Hence the level of occupancy of the core network may be disregarded for setting resp. continuing the connection via the new serving base station.

This is an important step, as for NB-IoT no common mobility measures, in particular handover are supported. hence a switch to another base station is carried out by a moving user equipment upon detection of a radio link failure with the base station was camping on before.

According to the fourth aspect of the invention it is proposed a base station of a cellular network assigned to at least two core networks in co-existence mode of a cellular network, providing direct connection termination access to one of said core networks, for at least one user equipment camping on the base station, the base station being configured to:
send a resource indication transmission to at least one of the camping user equipment, wherein the resource indication transmission indicates available resources of at least two of the at least two core networks, receive a connection request comprising a resource indication of the selected core network, set up a connection with the selected core network comprising indicating the selected resource to the selected core network, send a connection setup indication to the requesting user equipment.

The base station according to this aspect of the invention comprises receiving and transmitting circuitry as well as at least one antenna. It is further communicatively coupled to at least two core networks of different technology standards. Further it comprises processing circuitry for controlling operation of the base station. Additionally it comprises volatile and/or permanent memory at least for storing configuration and operating software.

The base station according to this aspect of the invention shares the advantages of the third aspect of the invention.

As it is shown this invention advantageously solves the depicted problem and suggests a solution where the user equipment and the base station operate in a way that is matching the new cellular network topology without putting too much additional efforts on the user equipments.

BRIEF DESCRIPTION OF THE DRAWINGS

The following description and the annexed drawings set forth in detail certain illustrative aspects and are indicative of but a few of the various ways in which the principles of the embodiments may be employed. Characteristics and advantages of the present invention will appear when reading the following description and annexed drawings of advantageous embodiments given as illustrative but not restrictive examples.

Figure 1:
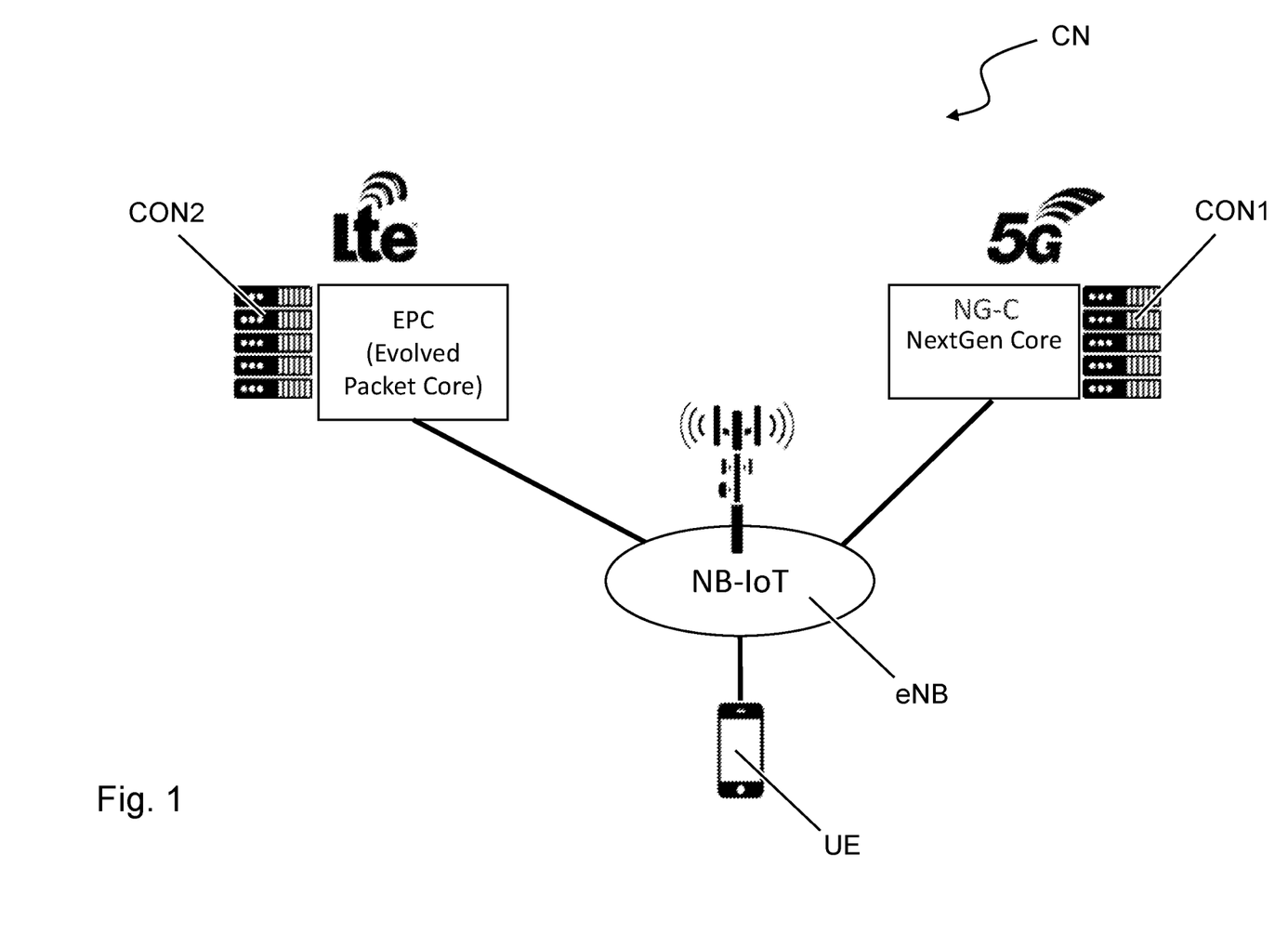
FIG. 1 represents a user equipment of the type to which the present invention is applied to as an embodiment in conjunction with a base station according to the fourth aspect of the invention.

FIG. 1 schematically shows a user equipment UE of the type to which the present invention is applied to as an embodiment. The user equipment UE is camping on a base station eNB supporting the NB-IoT category. The base station eNB according to this embodiment might therefore be a 4G or a 5G base station, as NB-IoT is for both technology standards defined, at least backwards compatible.

The base station is connected to at least two core networks, in the case core network CON1, which supports 5G (New Radio) and core network CON2, supporting 4G (LTE). The core networks of the respective technology standards are called for 4G Evolved Packet Core (EPC) and for 5G NextGen-Core.

Each core network provides different capabilities. E.g. the 5G core network CON1 might have the capability of supporting certain slices, e.g. for ultra-reliable communication or dedicated for machine-type communication.

With a user equipment UE operating in NB-IoT with the base station eNB it is however the case, that a connection is terminated directly in the core network. Hence, the user equipment UE needs in the displayed situation take the selection decision to which core network it wants to connect.

Figure 2:
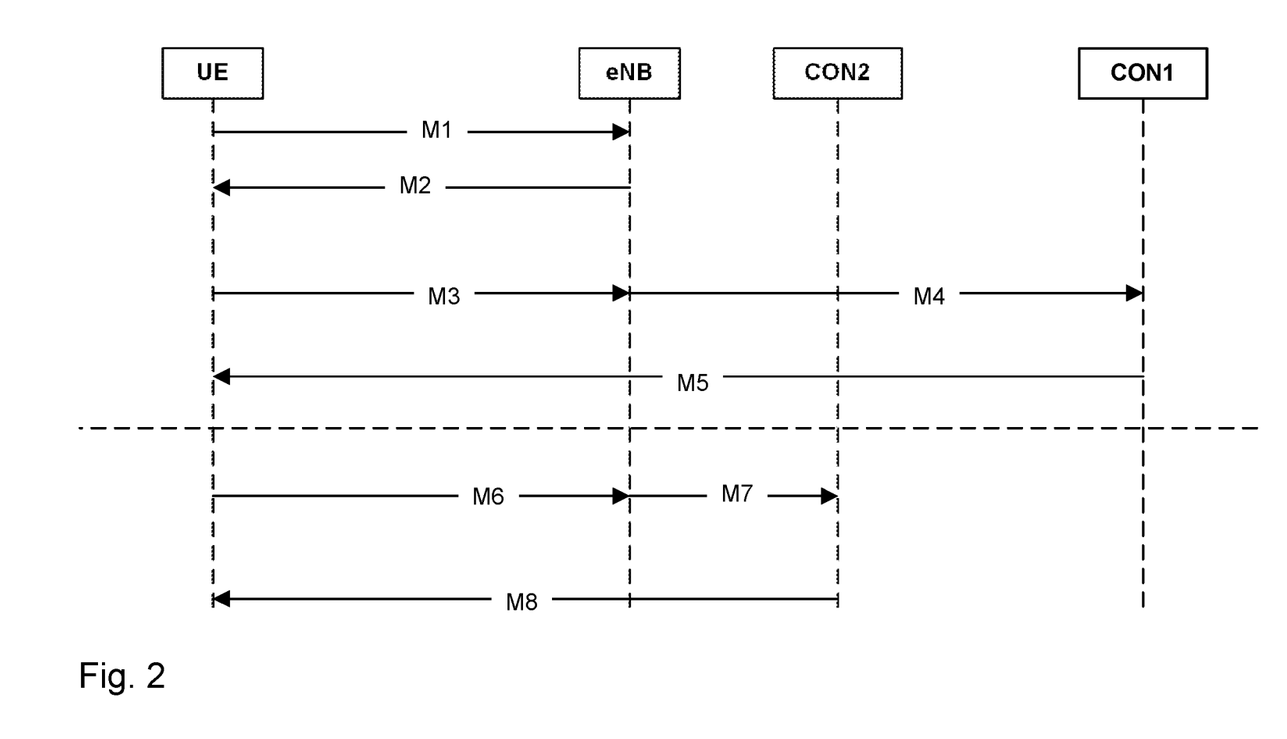
FIG. 2 shows a sequence diagram of a preferred embodiment of the inventive method.

For doing so the inventive method is illustrated in an exemplifying embodiment in FIG. 2. This is a sequence diagram showing the main steps of the exemplifying embodiment.

The sequence starts with a user equipment UE camping with message M1 on base station eNB. This is typically carried out based on measurements of the user equipment UE finding the best suitable base station.

The step of camping usually might take more substeps, including activity from the base station, but for the sake of simplicity it is depicted with one message M1. The user equipment is at this time expected to camp on the base station eNB in idle mode, that is no connection was set up. Both the user equipment and the base station are supposed to communicate in category NB-IoT.

The base station has access to the two core networks CON1 (5G, NextGenCore) and CON2, (LTE, EPC).

When camping on the base station the user equipment monitors the broadcasted signals from base station eNB. One of the broadcast transmission M2 comprises an indication about available resources both at core network CON1 and core network CON2.

In the following two outcomes are shown. In the first option with message M3 the user equipment sends a connection request comprising selected resources indicated in the broadcast of message M2. With this selection the user equipment indicates to the base station to which core network it wants to setup a connection. In the first option this was the 5G core network CON1, consequently the base station directly forwards with message M4 the connection request to the core network. Typically specific core network components are designated to handle such a request.

With message M5 the core network responds via the base station to the requesting user equipment with a connection setup message or a connection rejection. Technically speaking the user equipment receives the message transmitted from the base station, but directly triggered by the core network CON1.

In the other alternative (below the dashed line) the resources chosen by the user equipment with the connection request message M6 are belonging to the core network CON2, in this example LTE. Therefore the base station eNB forwards with message M7 the request to the core network CON2. In response message M8 the user equipment is informed about if the connection could be set up or not.

The selection of the two options is driven by the question which of the core networks is appropriate for the envisaged connection. This in particular considers availability and capability of the respective core networks. If a core network is barred, at least for NB-IoT user equipments, the user equipment will most probably select the other core network. If however the requirement has a high priority for being appropriate, this means that only core networks providing the capability to support the respective requirement would be selected. In extreme this can mean that none is selected.

This in particular applies e.g. when the 5G core network comprises a remote provisioning slice, where unprovisioned user equipments may access. If the 5G core network is however barred, the user equipment would not access the 4G core, which has nothing available like that.

If the connection setup was successful either following message M5 or M8, then the user equipment is operating in connected mode with the respective core network. Now data transmissions, in particular to a remote server accessibly via the respective core network, are possible to be carried out, both in uplink and in downlink direction.

The shown exemplifying embodiment relates to the initial setup of a connection. It shows in what sense the base station is involved, which is mainly a data pipe, the decisions are made at the user equipment for the core network to address, and at the respective core network, if a connection is set up.

Figure 3:
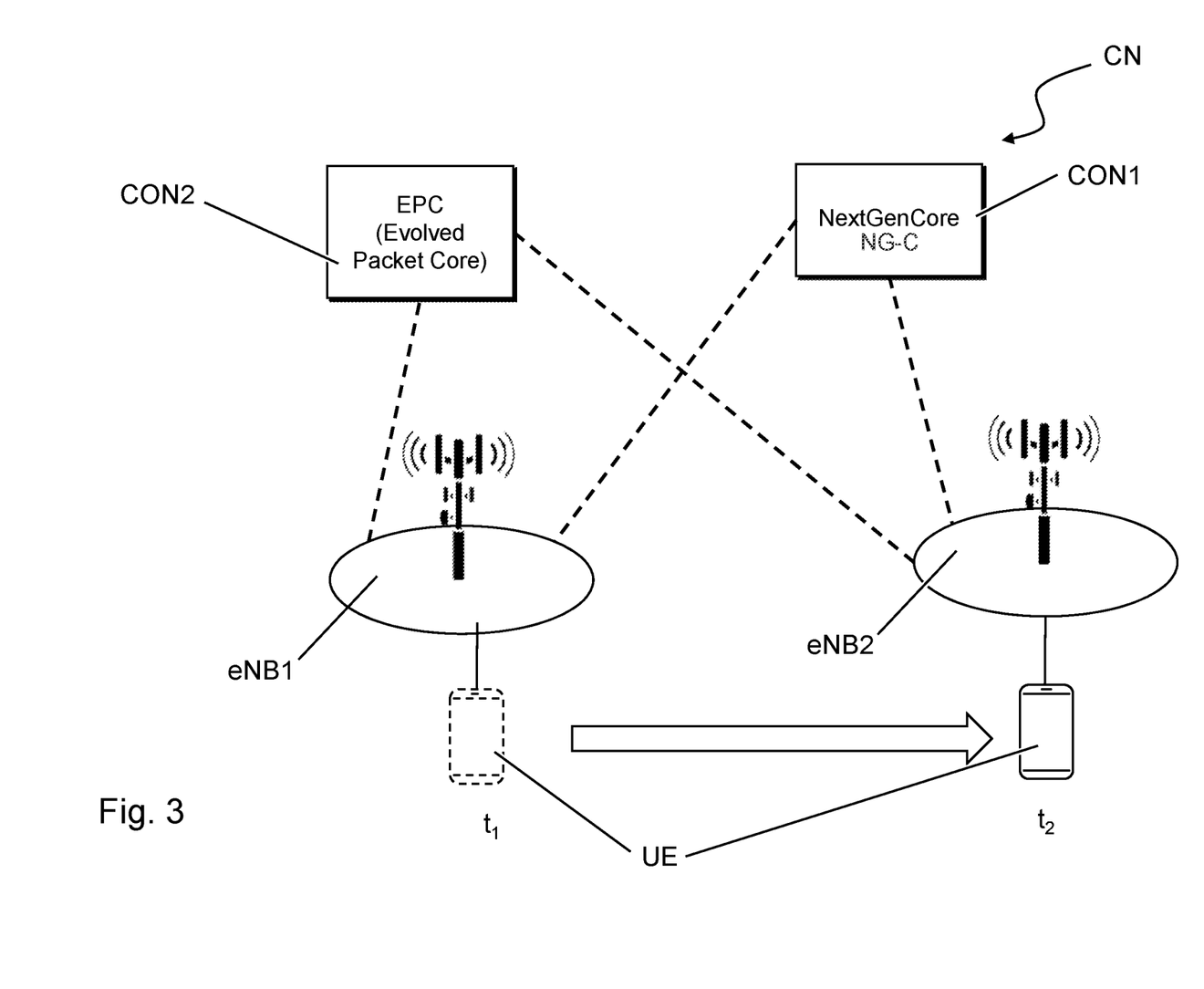
FIG. 3 represents in another exemplifying embodiment a user equipment operating non-stationary with two base stations.

With FIG. 3 the subsequent communication after setting up the connection is shown in another exemplifying embodiment. For the situation of a stationary user equipment which does not move, it is probably advantageous to stay on the base station it originally camped on once the connection is set up.

The user equipment UE as shown in FIG. 3 is however operating non-stationary, that means it is moving. In the shown example after camping on base station eNB1 and setting up a connection at time $t_1$ with the selection of one of the core networks CON1, CON2 the user equipment UE moved away from the base station eNB1.

At time $t_2$ it turned out that the signals from base station eNB1 are received that bad, that a radio link failure (RLF) appears. This indicates to a user equipment UE operating in NB-IoT, that it cannot continue operating with said currently serving base station.

Hence the user equipment UE selects a better suitable base station, in this case base station eNB2.

Also base station eNB2 has access to the two core networks CON1 and CON2. The user equipment consequently receives a broadcast from the base station eNB2 which resources of the two core networks are available. Then it sends a connection request with a selected resource to the base station.

There could be the situation that the selected core network is meanwhile fully occupied, at least for NB-IoT user equipments. As the user equipment UE simply wants to continue the existing connection which was setup via base station eNB1 with the new base station eNB2, the user equipment sends with the connection request an indication informing the base station that a connection was already in place. Consequently the addressed core network can therefore decide to continue the connection with this user equipment.

With that embodiment it is assured that a continuing connection for a NB-IoT user equipment UE is assured. When once the connection is in place it will normally be privileged compared to user equipments who want to set up a new connection. This is solved with this embodiment of the inventive method.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. A method for operating a user equipment with a base station assigned to at least two core networks in co-existence mode of a cellular network, the user equipment operating in a data communication mode with direct connection termination in the at least one core network, the method comprising the steps for the user equipment of:
- camping on a base station with access to at least two core networks of different technology standards,
- receiving a transmission from said base station indicating available radio resources of the at least two core networks,
- selecting a core network of the at least two core networks which is appropriate for an envisaged connection,
- sending a connection request for the envisaged connection to the base station using parts of said indicated radio resources belonging to the selected core network,
- receiving a response indication from the base station; wherein access to said selected core network is allowed despite a level of occupancy.

2. The method according to claim 1, wherein the selection of the core network comprises considering availability of a core network capability.

3. The method according to claim 2, wherein said core network capability is at least one of:
- a network slice,
- a network service,
- a desired power saving,
- a desired Quality of Service (QoS),
- a special communication form,
- a roaming criterion.

4. The method according to claim 1, further comprising the steps of receiving a message from said base station indicating the level of occupancy of one of said core networks, and considering said level of occupancy for the step of selecting the core network.

5. The method according to claim 1, further comprising the steps of receiving a message from said base station indicating barring of one of said core networks, and considering said barring indication for the step of selecting the core network.

6. A user equipment f or operating with a base station assigned to at least two core networks in co-existence mode of a cellular network, the user equipment operating in a mode with direct connection termination in the at least one core network, wherein the user equipment is configured to:
- camp on a base station with access to at least two core networks of different standards,
- receive a transmission from said base station indicating resources of the at least two core networks,
- select a core network of the at least two core networks which is appropriate for an envisaged connection,
- send a connection request for the envisaged connection to the base station using said indicated resource belonging to the selected core network;
- wherein access to said selected core network is allowed despite a level of occupancy.

7. The user equipment according to claim 6, further configured to receive a message from said base station indicating the level of occupancy of one of said core networks, and to consider said level of occupancy for the step of selecting the core network.

8. A method for operating abase station assigned to at least two core networks in co-existence mode of a cellular network, providing direct connection termination access to one of said core networks, for at least one user equipment camping on the base station, the method comprising the steps of:
- sending a resource indication transmission to at least one of the camping user equipments, wherein the resource indication transmission indicates available resources of at least two of the at least two core networks,
- receiving a connection request wherein the connection request uses the available resources belonging to a selected core network,
- setting up a connection with the selected core network,
- sending a connection setup indication to the requesting user equipment;
- wherein the base station is further configured to retrieve a connection request from a user equipment with a selected core network, the method comprising the step of:
- determining if the user equipment has operated with a neighbor base station in said selected core network before,
- allowing access to said selected core network, despite a level of occupancy.

9. The method according to claim 8, further comprising the step of determining for at least one of the core networks if a given level of occupancy is reached, in response sending an occupancy message to at least one user equipment.

10. A base station of acellular network assigned to at least two core networks in co-existence mode of the cellular network, providing direct connection termination access to one of said core networks, for at least one user equipment camping on the base station, the base station being configured to:
- send a resource indication transmission to at least one of the camping user equipments, wherein the resource indication transmission indicates available resources of at least two of the at least two core networks,
- receive a connection request wherein the connection request uses the available resources belonging to a selected core network,
- set up a connection with the selected core network,
- send a connection setup indication to the requesting user equipment;
- wherein the base station is further configured to retrieve a connection request from a user equipment being indicative of a selected core network, to determine if the user equipment has operated with a neighbor base station in said selected core network before, and to allow access to said selected core network, despite a level of occupancy.

11. The base station according to claim 10, further configured to determine for at least one of the core networks if a given level of occupancy is reached, and in response, send an occupancy message to at least one user equipment.

12. The method of claim 1, wherein for a user equipment operating mobile and being capable to select a new serving base station in case of detecting a radio link failure for a communication with a previously serving base station, the method further comprising the steps of:
- selecting new serving base station,
- sending a connection request to the new serving base station indicating a core network operated with the previously serving base station.

13. The user equipment of claim 6, wherein the user equipment further operating mobile and being configured to select a new serving base station in case of detecting a radio link failure related to a communication with a previously serving base station, the user equipment being configured to:
   select the new base station,
   send a connection request to the new serving base station indicating a core network used with the previously serving base station.

* * * * *